(No Model.)
W. A. McWHORTER.
FERTILIZER DISTRIBUTER.
No. 339,454. Patented Apr. 6, 1886.
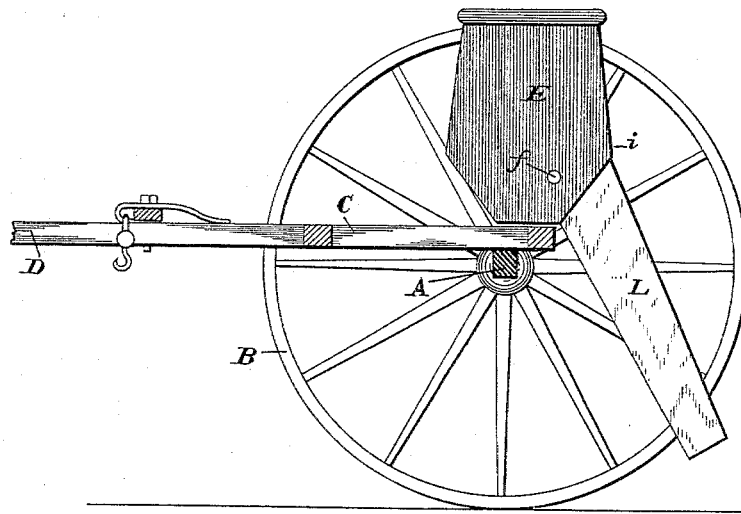
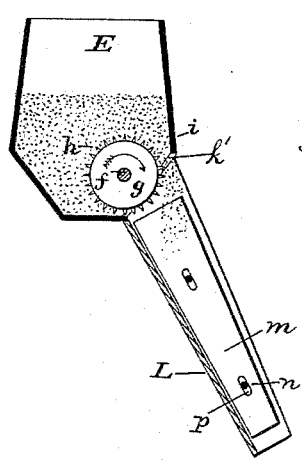
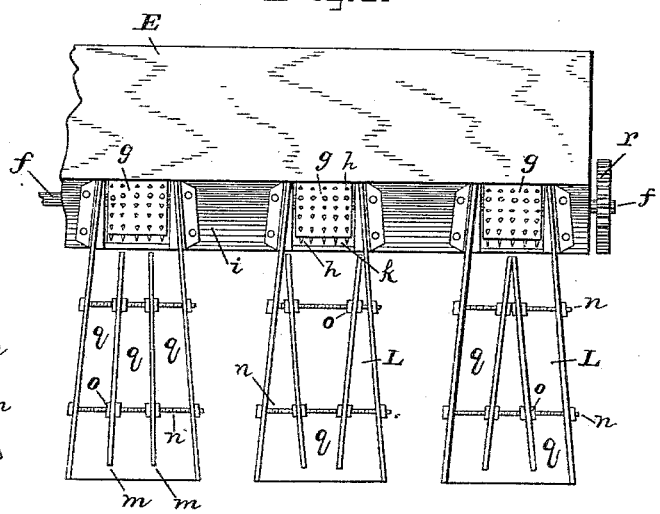
Witnesses
R. F. Boyden.
John E. Morris.
Inventor
Wm. A. McWhorter
Attorney
Chas. B. Mann

UNITED STATES PATENT OFFICE.

WILLIAM A. McWHORTER, OF NORFOLK, VIRGINIA.

FERTILIZER-DISTRIBUTER.

SPECIFICATION forming part of Letters Patent No. 339,454, dated April 6, 1886.

Application filed January 13, 1886. Serial No. 188,387. (No model.)

*To all whom it may concern:*

Be it known that I, WILLIAM A. McWHORTER, a citizen of the United States, residing at Norfolk, in the county of Norfolk and State of Virginia, have invented certain new and useful Improvements in Fertilizer-Distributers, of which the following is a specification.

My invention relates to a fertilizer-distributer.

The invention comprises certain improvements, which will first be described and then claimed.

In the accompanying drawings, which illustrate the invention, Figure 1 is a side elevation of the machine mounted on wheels, in which certain parts are shown in section. Fig. 2 is a vertical cross-section of the hopper and parts which effect the distribution of the fertilizer. Fig. 3 is a rear elevation of the parts seen in Fig. 2.

The letter A designates the axle supported by wheels B; C, the frame resting on the axle, and D the tongue. These parts may be of any well-known or desired construction. The hopper E is supported on the frame, and has a shaft, $f$, extending through it horizontally from end to end, and carries upon it feed rollers or drums $g$, which have prongs $h$. This feed-drum turns in a vertical plane. One side, $i$, which is the rear of the hopper, has openings $k$, through each of which one of the drums $g$ partly projects. In rotating, as indicated by the arrow in Fig. 2, the top side of the drum turns toward the said opening $k$, and a discharge-outlet, $k'$, is formed in the hopper-side at the upper part of the said opening $k$ and directly in front of the top portion of the drum. Thus the discharge-outlet is not below the feed-drum, but is elevated, whereby the fertilizer will be carried on the upper surface of the feed-drum, and thereby discharged through the said elevated outlet $k'$. A discharge-chute, L, has its upper end made fast to the rear side, $i$, of the hopper, and said upper end incloses or surrounds three sides of the opening $k$. From the hopper the chute inclines down and to the rear. By this construction and arrangement the fertilizer which discharges through the elevated outlet $k'$ will drop into the chute, as illustrated in Fig. 2.

The discharge-chutes are each provided with movable partitions $m$, which, by means of suitable holding devices, are arranged to be set and retained in any desired position, and thereby direct the fertilizer in its descent through the chute and cause its delivery in a prescribed manner.

The holding devices here shown comprise two rods, $n$, secured crosswise in the chute. These rods are screw-threaded and have nuts $o$. The partitions $m$ have holes or slots $p$, through which the rods $n$ pass, and as these holes or slots are slightly larger than the rods, said partitions, it will be seen, are thereby loose or movable, and may be shifted on the rods to any desired position, where they are retained by the nuts $o$.

It will be obvious to any mechanic that other forms of holding device than the nuts $o$ on the screw-threaded cross-rods may be employed. In Fig. 3 three chutes are shown, and the partitions in each chute are set at a different position, for the purpose of illustrating the various results which may be obtained in the delivery of the fertilizer on the ground. In the chute at the left-hand side the two partitions are set about parallel, and as nearly as may be are equally spaced apart. This provides for the fertilizer flowing down the three spaces $q$ thus formed in the chute, and thereby insures that it will be delivered on the ground in a row of breadth about equal to the lower end of the chute. In the chute at the right-hand side the two partitions are set with their upper ends in contact at the center of the chute, and their lower ends widely spread apart. This provides for the formation of two side spaces, $q$, down which the fertilizer flows, and is delivered on the ground in two narrow rows. In the center chute of Fig. 3 the two partitions are set with their upper ends spread apart to the greatest extent, and in contact with the sides of the chute, and therefrom to their lower ends the two partitions incline toward each other and form a single narrow passage, $q$, from which the fertilizer is delivered on the ground. It will thus be seen the chutes, with the movable partitions here shown, enable the operator to have fertilizer placed in one of various positions with respect to growing plants, according to the attendant circumstances. The shaft $f$ has at one end a gear-wheel, $r$, which engages with a suitable gear-wheel set in motion by the supporting-wheel B. For this purpose any of the usual or well-known driving mechanisms now employed on grain-drills may be used.

Having described my invention, I claim and desire to secure by Letters Patent of the United States—

1. A fertilizer-distributer having in combination a hopper provided in its vertical side with an opening, $k$, and a feed-drum, $g$, to turn in a vertical plane, projecting partly through said opening, and leaving at the upper part thereof an elevated discharge-outlet, $k'$, whereby the fertilizer will be discharged by the action of the upper surface of the feed-drum, as set forth.

2. A fertilizer-distributer having a discharge-chute provided with movable partitions, and means for holding said partitions in any desired position, whereby the fertilizer descending the chute may be delivered on the ground in a prescribed manner, as set forth.

3. A fertilizer-distributer having a discharge-chute provided with cross-rods, partitions which are movable on the cross-rods, and holding devices, substantially as described, for retaining the partitions in any desired position, as set forth.

In testimony whereof I affix my signature in presence of two witnesses.

WILLIAM A. McWHORTER.

Witnesses:
A. JEFFERS,
E. M. LAWSON.